US012549972B2

(12) United States Patent
Stuhlfauth et al.

(10) Patent No.: US 12,549,972 B2
(45) Date of Patent: Feb. 10, 2026

(54) BASE STATION TEST SYSTEM AND METHOD (71) Applicant: Rohde & Schwarz GmbH & Co. KG, Munich (DE)

(72) Inventors: Reiner Stuhlfauth, Landau (DE); Sandra Merkel, Munich (DE); Rabih El-Masri, Munich (DE); Daniela Raddino, Munich (DE); Lucas Chavarria-Gimenez, Aalborg (DK)

(73) Assignee: Rohde & Schwarz GmbH & Co. KG, Munich (DE)

( * ) Notice: Subject to any disclaimer, the term of this patent is extended or adjusted under 35 U.S.C. 154(b) by 648 days.

(21) Appl. No.: 17/960,478

(22) Filed: Oct. 5, 2022

(65) Prior Publication Data
US 2024/0121638 A1 Apr. 11, 2024

(51) Int. Cl.
H04W 24/06 (2009.01)
H04B 17/00 (2015.01)
H04W 84/06 (2009.01)

(52) U.S. Cl.
CPC ........ *H04W 24/06* (2013.01); *H04B 17/0085* (2013.01); *H04W 84/06* (2013.01)

(58) Field of Classification Search
CPC ... H04W 24/06; H04W 84/06; H04B 17/0085
See application file for complete search history.

(56) References Cited

U.S. PATENT DOCUMENTS

| 7,653,349 | B1* | 1/2010 | Patel | H04H 40/90 |
| | | | | 725/124 |
| 2007/0192805 | A1* | 8/2007 | Dutta | H04H 20/74 |
| | | | | 725/144 |
| 2013/0114648 | A1* | 5/2013 | Bittner | H04B 7/18517 |
| | | | | 375/211 |
| 2016/0156408 | A1* | 6/2016 | Arcidiacono | H04B 7/18519 |
| | | | | 455/12.1 |
| 2021/0014015 | A1* | 1/2021 | Suzuki | H04W 4/42 |
| 2022/0376771 | A1* | 11/2022 | Fujii | H04B 7/18504 |
| 2024/0188032 | A1* | 6/2024 | Medles | H04W 56/0035 |

FOREIGN PATENT DOCUMENTS

CN 107612610 A * 1/2018
WO 2021251888 A1 12/2021

* cited by examiner

*Primary Examiner* — Tejis Daya
(74) *Attorney, Agent, or Firm* — Patterson + Sheridan, LLP (57) ABSTRACT The present disclosure provides a base station test system comprising a link signal acquisition interface configured to acquire a link signal from a device under test, wherein the device under test comprises at least part of a non-terrestrial-network access node, also called NTN access node, and a link signal processor coupled to the link signal acquisition interface, wherein the link signal processor is configured to determine at least one parameter for the device under test based on the acquired link signal. In addition, the present disclosure provides a respective method.

14 Claims, 8 Drawing Sheets

BASE STATION TEST SYSTEM AND METHOD

TECHNICAL FIELD

The disclosure relates to a base station test system and a respective method.

BACKGROUND

Although applicable to any type of base station measurement application, the present disclosure will mainly be described in conjunction with non-terrestrial-network or NTN communications.

Modern wireless communication systems not only comprise earthbound communication units, like fixed position base stations and mobile user equipment. Instead, such modern wireless communication systems may also comprise non-terrestrial-network or NTN communication components.

Testing of such NTN communication components may be difficult.

Accordingly, there is a need for simplifying testing of NTN communication equipment.

SUMMARY

The above stated problem is solved by the features of the independent claims. It is understood, that independent claims of a claim category may be formed in analogy to the dependent claims of another claim category.

Accordingly, it is provided:

A base station test system comprising a link signal acquisition interface configured to acquire a link signal from a device under test, wherein the device under test comprises at least part of a non-terrestrial-network access node, also called NTN access node, and a link signal processor coupled to the link signal acquisition interface, wherein the link signal processor is configured to determine at least one parameter for the device under test based on the acquired link signal.

Further, it is provided:

A method for testing a base station comprising acquiring a link signal from a device under test, wherein the device under test comprises at least part of a non-terrestrial-network access node, and determining at least one parameter for the device under test based on the acquired link signal.

The present disclosure is based on the finding, that a non-terrestrial-network or NTN communication link may comprise multiple components. For example, a satellite-based NTN access node requires at least three components to be operated.

A satellite-based NTN access node may e.g., comprise a ground-based base station, for example, a 5G base station, also called gNB base station, that is coupled to a 5G core network and to an NTN gateway that provides a feeder link with a satellite-based payload. On the other side, the satellite-based payload couples to a user equipment or UE via a service link. The term satellite-based payload refers to a network or communication node that is provided on a satellite and, therefore, spaceborne.

It is understood, that in the context of the present disclosure, the terms non-terrestrial-network or NTN are not meant to be limited to satellite-based applications. Instead, the terms non-terrestrial-network or NTN are meant to comprise any non-earthbound application, like at least one of satellite-based communications, high altitude platform systems, HAPS, and air-to-ground networks. Satellite-based communications may comprise any communication device that is required to perform communication between an earthbound network and a communication device via a satellite, as is the case with a 5G NTN communication between the 5G core network and a respective UE. A high altitude platform system or HAPS usually comprises an airborne platform, which may comprise but is no limited to airplanes, balloons, and airships. Such HAPS platforms may provide services in the same frequency range as terrestrial mobile networks and may be called High Altitude Platform Stations as IMT Base stations or HIBS. Air-to-ground networks usually aim to provide in-flight connectivity for airplanes by utilizing ground stations which play a similar role as a base station in a terrestrial mobile network.

It is understood, that any reference to network communication standards in the present disclosure, like a reference to 5G, or the technical terms used in this disclosure are to be interpreted as referring to or according to the 3rd generation partnership project, 3GPP, standards, especially regarding the global 5th generation wireless technology in releases 15 to 17, and any possible upcoming release, which enable 5G systems to support non-terrestrial communication networks. This is especially true for terms like the feeder link downlink signal, the serving link downlink signal, the feeder link uplink signal, the serving link uplink signal, NTN or non-terrestrial-network, gNB, base station, and gateway or NTN gateway.

The base station test system of the present disclosure serves mainly for testing the non-terrestrial component i.e., the payload in a satellite or an airborne platform.

To this end, the base station test system comprises a link signal acquisition interface and a link signal processor. The link signal acquisition interface acquires a link signal from a device under test and provides the link signal to the link signal processor that determines at least one parameter for the device under test based on the acquired link signal.

The link signal acquisition interface may comprise a wired or wireless acquisition interface for acquiring the link signal from the device under test.

In case of a wired link signal acquisition interface, the link signal acquisition interface may comprise any required type of ports and connectors, especially coaxial connectors, and respective cables may be used to couple the link signal acquisition interface to the device under test. The link signal acquisition interface may in embodiments be provided as a signal acquisition interface of a measurement device, for example, an oscilloscope, a signal analyzer, especially a vector signal analyzer, or a spectrum analyzer The link signal processor may comprise a processing element capable of determining the required parameter for the device under test based on the acquired link signal. It is understood, that the link signal processor may comprise further components or circuitry that enables the processing element to operate on the acquired link signal. Such further components or circuitry may especially comprise at least one of filters, attenuators, amplifiers, and analog-to-digital converters.

The processing element may be provided as at least one of a dedicated processing element e.g., a processing unit, a microcontroller, a field programmable gate array, FPGA, a complex programmable logic device, CPLD, an application specific integrated circuit, ASIC, or the like. The processing element may at least in part also be provided as a computer program product comprising computer readable instructions that may be executed by a processing element. In a further embodiment, the processing element may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

The at least one parameter that is to be determined for the device under test may refer to any parameter that characterizes the operation of the device under test. Such parameters may refer to physical properties of the data transmission performed by the device under test, like frequencies, and signal power levels, as well as to content-related parameters, like a performance or throughput of the device under test.

The device under test may especially comprise a payload i.e., a communication device provided on a non-terrestrial carrier that performs communication with an NTN gateway via a feeder link and with a UE via a serving link. The payload may in embodiments comprise a transparent payload. Such a transparent payload may receive a service link uplink signal, change the carrier frequency of the serving link uplink signal, filter and amplify the signal, and transmit the filtered and amplified signal via the feeder link downlink signal to the NTN gateway, or vice versa.

With the base station test system according to the present disclosure, it is possible to test the payload part of an NTN base station, especially the payload of the NTN base station, and determine the required parameters for the device under test. This especially allows performing tests according to the 3GPP base station test requirements. These requirements comprise e.g., determining if a satellite access node or payload achieves 95% of a theoretical throughput based on a defined fixed reference channel FRC. Calculating the throughput is, however, only possible in the baseband part of a gNB base station.

The baseband part may with the base station test system be provided by the link signal processor, and the required tests may be fully implemented without providing a gNB base station in the test system.

Further embodiments of the present disclosure are subject of the further dependent claims and of the following description, referring to the drawings.

In the following, the dependent claims referring directly or indirectly to claim 1 are described in more detail. For the avoidance of doubt, the features of the dependent claims relating to the base station test system can be combined in all variations with each other and the disclosure of the description is not limited to the claim dependencies as specified in the claim set. Further, the features of any of the claims relating to the base station test system may also be implemented as analogous method steps.

In an embodiment, which can be combined with all other embodiments of the base station test system mentioned above or below, the link signal processor may comprise a demodulator that is configured to demodulate the acquired link signal.

The demodulator may be provided as a dedicated element in the link signal processor.

As alternative, the demodulator may at least in part be provided as a component or function in a processing element of the link signal processor. Such a demodulator may be seen as a kind of software defined radio, and may easily be adapted to different modulation schemes that may be used in the link signal.

It is understood, that the demodulator may comprise any additional elements that are required to demodulate the acquired link signal, like filters, amplifiers, mixers, and down-converters.

An external demodulator may also be provided. Such a demodulator may be provided before the link signal acquisition interface or between the link signal acquisition interface and the link signal processor.

With the demodulator it is possible to demodulate the link signal and assess different parameters of the demodulated link signal as provided by the device under test.

In a further embodiment, which can be combined with all other embodiments of the base station test system mentioned above or below, the link signal processor may further comprise a decoder that is coupled to the demodulator, and that is configured to decode the demodulated acquired link signal.

The decoder may be provided as a dedicated element in the link signal processor.

As alternative, the decoder may at least in part be provided as a component or function of a processing element in the link signal processor. Such a decoder may be seen as part of a kind of software defined radio device that may be provided for receiving and processing the acquired link signal. A decoder that is at least in part implemented in software may easily be adapted to different communication protocols.

An external decoder may also be provided. Such a decoder may be provided before the link signal acquisition interface or between the link signal acquisition interface and the link signal processor, or the demodulator and the link signal processor.

With the decoder it is possible to acquire the content or data that is provided in the acquired link signal and to perform further analysis functions on that data or content.

In an embodiment, which can be combined with all other embodiments of the base station test system mentioned above or below, the link signal acquisition interface may be configured to acquire a feeder link downlink signal provided by the device under test.

The feeder link between an NTN spaceborne or airborne communication device i.e., the device under test, and the terrestrial gateway, also called NTN gateway, may also be called satellite radio link. The feeder link provides the communication connection between the NTN spaceborne or airborne communication device i.e., the payload, and the NTN gateway. In embodiments, the feeder link may comprise or transmit 5G signals.

The feeder link downlink signal is the signal that is communicated form the NTN spaceborne or airborne communication device i.e., the device under test, to the NTN base station, or in case of the base station test system to the link signal acquisition interface.

As indicated above, the link signal acquisition interface may be coupled via a respective cable connection to the device under test. In the alternative of the link signal acquisition interface being wirelessly coupled to the device under test, the link signal acquisition interface may, of course, comprise respective antennas for acquiring the feeder link downlink signal.

The base station test system may also comprise a test chamber that accommodates the device under test and comprises respective antennas on the inside, and antenna connectors on the outside.

In another embodiment, which can be combined with all other embodiments of the base station test system mentioned above or below, the base station test system may further comprise a first signal generator configured to generate a serving link uplink signal, and to provide the generated serving link uplink signal to the device under test.

In embodiments, the device under test may comprise an internal test signal generator that provides a signals that serves as a basis for the device under test to generate the feeder link downlink signal.

In other embodiments, an external signal source may be required that allows the device under test to generate the feeder link downlink signal. To this end, the first signal generator may be provided.

The first signal generator may generate a serving link uplink signal that the device under test may require to generate the feeder link downlink signal. The first signal generator may be seen as a kind of signal emulator.

In case of a payload for NTN communication being the device under test, the serving link uplink signal is a signal on which the payload operates during normal operation and that the payload uses to generate the feeder link downlink signal. Providing such an emulated signal to the device under test will, therefore, ensure that the device under test is tested under the most real conditions.

While evaluating the device under test, the first signal generator may vary the generated serving link uplink signal. The first signal generator may, for example, vary the signal power of the serving link uplink signal in order to test the sensitivity of the receiver in the device under test. To this end, controllable amplifiers and/or attenuators may be provided.

It is understood, that the first signal generator may be provided as dedicated unit or element, and may comprise any required analog and digital circuitry. The first signal generator may in embodiments be provided as, or as element in a signal generator, for example an ARB, also called arbitrary waveform generator.

In embodiments, a measurement device with signal generation capabilities may be provided. Such a measurement device may comprise a signal acquisition and processing section that implements the link signal acquisition interface and the link signal processor. Such a measurement device may also comprise a signal generation circuitry or function for generating the serving link uplink signal.

In a further embodiment, which can be combined with all other embodiments of the base station test system mentioned above or below the base station test system may further comprise an interference emulator coupled to or integrated into the first signal generator and configured to add a predetermined interference to the generated serving link uplink signal prior to transmission of the generated serving link uplink signal to the device under test.

The term interference is to be understood as non-limiting and as broad as possible, wherein the predetermined interference may comprise any signal or signal component that may be combined with the serving link uplink signal in order to modify the serving link uplink signal. The interference may, for example, comprise, but is not limited to, signal fading, blocking, intermodulation, and adjacent channel signals.

The interference emulator may in embodiments be provided as a dedicated signal generation device with a respective signal output, especially a RF signal output. The signal provided by such a dedicated interference emulator may then be combined e.g., mixed, with the signal provided by the first signal generator.

In addition, or as alternative, the interference emulator may at least in part be integrated into or provided in the first signal generator. In such embodiments, the predetermined interference may be provided in the digital domain of the first signal generator and/or in the analog domain in the first signal generator.

In yet another embodiment, which can be combined with all other embodiments of the base station test system mentioned above or below, the link signal processor may be configured to determine at least one of a throughput, and a delay for the device under test.

The throughput of the device under test may in case of a 5G NTN communication only be determined after demodulating and decoding the acquired link signal.

Therefore, after decoding and demodulating the acquired link signal, the link signal processor may determine the throughput of the device under test. To this end, the link signal processor may in embodiments determine the Block Error Ratio, also called BLER. A BLER is defined as the ratio of the number of erroneous blocks received compared to the total number of blocks received.

The BLER may, for example, be calculated by evaluating the cyclic redundancy check, also called CRC, on each block of data that is received and by counting erroneous blocks. A block may be identified as erroneous, if the CRC is wrong i.e., the CRC check fails.

The delay introduced by the device under test may be determined by comparing the time of sending a serving link uplink signal to the device under test and the time of reception of the feeder link downlink signal.

For sending the serving link uplink signal to the device under test, the above-mentioned first signal generator may be provided. As alternative, the link signal processor may receive the time of sending the serving link uplink signal to the device under test from an external source. To this end, the link signal processor may comprise a respective communication or synchronization interface or may be coupled to a communication interface of the base station test system.

In a further embodiment, which can be combined with all other embodiments of the base station test system mentioned above or below, the link signal acquisition interface may be configured to acquire a serving link downlink signal provided by the device under test.

The serving link between an NTN spaceborne or airborne communication device i.e., the device under test, and terrestrial user equipment, also called UE, serves for communicating data between the communication device and the final user equipment, which may in embodiments be a 3GGP 5G user equipment.

The device under test may generate a serving link downlink signal based on a respective feeder link uplink signal. To this end, the device under test may comprise an internal test signal generator that may generate the respective feeder link uplink signal, or any external test signal generator may be provided.

It is understood, that if the link signal acquisition interface is configured to acquire both, the feeder link downlink signal, and the serving link downlink signal, the link signal acquisition interface may comprise a dedicated port for each one of the signals. The ports may, for example, be two different signal acquisition ports of a respective measurement application device.

In another embodiment, which can be combined with all other embodiments of the base station test system mentioned above or below, the base station test system may further comprise a second signal generator configured to generate a feeder link uplink signal, and to provide the generated feeder link uplink signal to the device under test.

In embodiments, an external signal source may be required that provides the basis for the device under test to generate the serving link downlink signal. To this end, the second signal generator may be provided.

The second signal generator may be provided as external signal source that generates a respective feeder link uplink signal to the device under test. The second signal generator may, consequently, be seen as a kind of signal emulator.

In case of a payload for NTN communication being the device under test, the feeder link uplink signal is a signal on which the payload operates during normal operation and that the payload uses to generate the serving link downlink signal. Providing such an emulated signal to the device under test will, therefore, ensure that the device under test is tested under the most real conditions.

While evaluating the device under test, the second signal generator may vary the generated feeder link uplink signal. The second signal generator may, for example, vary the signal power of the feeder link uplink signal in order to test the sensitivity of the receiver in the device under test.

It is understood, that the second signal generator may be provided as dedicated unit or element, and may comprise any required analog and digital circuitry. The second signal generator may in embodiments be provided as, or as element in a signal generator, for example an ARB, also called arbitrary waveform generator.

In embodiments, a measurement device with signal generation capabilities may be provided. Such a measurement device may comprise a signal acquisition and processing section that implements the link signal acquisition interface and the link signal processor. Such a measurement device may also comprise a signal generation circuitry or function for generating the feeder link uplink signal.

In yet another embodiment, which can be combined with all other embodiments of the base station test system mentioned above or below, the base station test system may further comprise a channel effect simulator coupled to or integrated into the second signal generator, and configured to simulate at least one of a doppler effect pre-compensation and a time pre-compensation in the generated feeder link uplink signal.

The 3GPP 5G work on NTN communication implements a doppler effect pre-compensation and a time pre-compensation that serve to reduce the influence of the doppler effect and the signal round trip time form the spaceborne or airborne payload to the ground-based NTN gateway.

To this end, an NTN gateway may determine a distance from the NTN gateway to the payload and a relative speed between the NTN gateway and the payload. From the relative speed, the NTN gateway may calculate and apply a pre-compensation for the doppler effect to ensure that the feeder link uplink signal arrives at the payload with the desired frequency.

The time pre-compensation may be applied to compensate for the increased signal propagation time between a ground-based NTN gateway and a spaceborne or airborne payload. For example, if a slot n should start at time t1, the NTN gateway may instead start the respective slot at t1−x, wherein x represents the signal propagation time. This enables the feeder link uplink signal to arrive with an accurate timing at the payload.

The channel effect simulator may replicate these functions of the NTN gateway in a way that the signal compensations may be applied to the feeder link uplink signal.

The channel effect simulator may in embodiments be provided as a dedicated signal modification device with a respective signal output, especially a RF signal output. The signal provided by such a dedicated channel effect simulator may then be combined e.g., mixed, with the signal provided by the second signal generator, if possible. As alternative, the channel effect simulator may operate on the signal provided by the second signal generator and modify the signal accordingly.

In addition, or as alternative, the channel effect simulator may at least in part be integrated into or provided in the second signal generator. In such embodiments, the doppler effect compensation and/or the time pre-compensation may be provided in the digital domain of the second signal generator and/or in the analog domain in the second signal generator.

In a further embodiment, which can be combined with all other embodiments of the base station test system mentioned above or below, the link signal processor may be configured to determine at least one performance parameter for the device under test.

Determining the performance of the device under test my comprise determining at least one of an error vector magnitude, also called EVM, an ACLR, also called Adjacent Channel Leakage Ratio, a SEM, also called spectrum emission mask, a transmit power, also called TX power, a power dynamic or power dynamic range, spurious emissions, a carrier frequency shift, a time alignment, and a time delay. It is understood, that the above-provided examples of possible parameters that may be determined as a performance indication are not to be construed as limiting, and that any other parameters may also be determined.

In order to determine the above-presented parameters, the link signal acquisition interface and the link signal processor may be provided as elements of a signal analyzer, especially a vector signal analyzer or a spectrum analyzer. Such devices may provide functions to determine the respective parameters.

It is understood that in embodiments, the base station test system may be provided in a single measurement application device that comprises the link signal acquisition interface and the link signal processor according to any of the embodiments disclosed herein, especially in any combination. Such a single measurement application device, therefore, may serve to determine the throughput and/or the delay for the device under test, as well as the at least one performance parameter. Such a single measurement application device may, consequently, comprise at least one of the demodulator, the decoder, the first signal generator, the interference emulator, the second signal generator, and the channel effect simulator. If necessary, any of these elements may also be provided externally to such a single measurement application device.

With such a single measurement application devices it is especially easy to determine any delay in the device under test, since all signals are generated and acquired in the same device and may be synchronized internally.

In other embodiments, where the signal generation and the acquisition are performed in different devices, such devices may be synchronized via a respective synchronization connection.

Possible measurement application devices may comprise, but are not limited to, for example, a vector network analyzer, especially with an integrated vector signal generator, or a spectrum analyzer. Determining the throughput and/or the delay for the device under test and determining the at least one performance parameter may be performed one after the other, or in parallel or simultaneously. This is especially possible, without modifying the test setup.

In an embodiment of the base station test system, two measurement application devices may be provided, each with signal acquisition and generation capabilities. One of these measurement application devices may be provided on the feeder link side of the device under test, while the other one of these measurement application devices may be provided on the serving link side of the device under test. In embodiments, each one of the measurement application devices may couple to the device under test on both sides. For example, one of the measurement application devices may generate the serving link uplink signal and receive the feeder link downlink signal, and the other may generate the feeder link uplink signal and receive the serving link downlink signal.

In embodiments, the base station test system may also be used to test a 5G integrated access backhaul node. Such nodes are usually linked to at least one parent node and a least one child node, wherein the respective node is communicatively situated between the parent node and the child node. A link between the parent node and the respective integrated access backhaul node may be denominated as uplink, while a signal between the child node and the integrated access backhaul node may be denominated as downlink. Of course, upstream signals and downstream signals may be transmitted in the uplink and the downlink. Similarly to the NTN spaceborne or airborne device under test, such an integrated access backhaul node may receive an upstream signal, either in the uplink or the downlink, and generate a respective downstream signal, in the downlink or the uplink, respectively.

Such a behavior of an integrated access backhaul node is analogous to the behavior of the NTN spaceborne or airborne device under test. The principles explained in this disclosure may, consequently, also be applied mutatis mutandis to testing of integrated access backhaul nodes.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
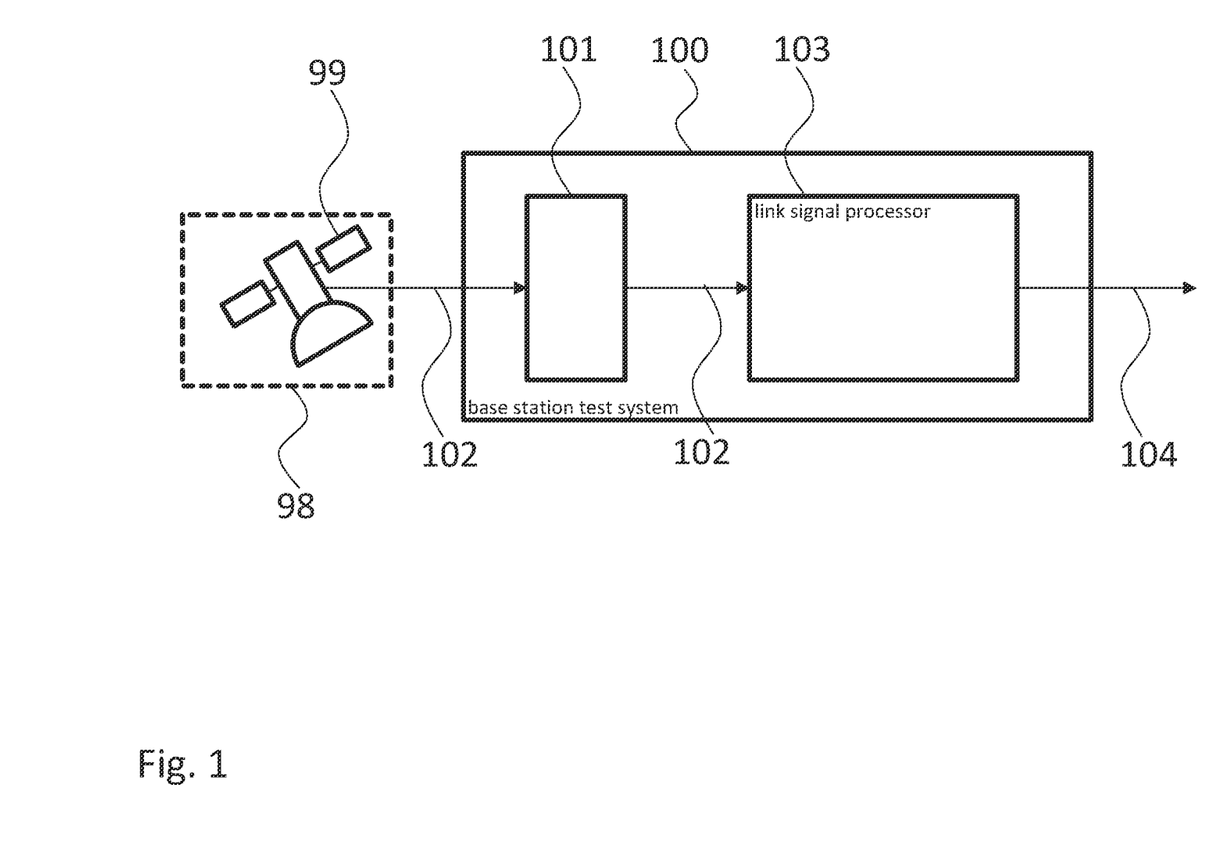
FIG. 1 shows a block diagram of an embodiment of a base station test system according to the present disclosure.

FIG. 1 shows a block diagram of a base station test system 100. The base station test system 100 comprises a link signal acquisition interface 101 that is coupled to a link signal processor 103.

The link signal acquisition interface 101 acquires a link signal 102 from a device under test 98. The device under test 98 comprises at least part of a non-terrestrial-network access node 99 and generates a respective link signal 102. The link signal processor 103 determines at least one parameter 104 for the device under test based on the acquired link signal.

It is understood, that the base station test system 100 with the link signal acquisition interface 101 and the link signal processor 103 may be provided as part of or integrated into a measurement application device, like a vector network analyzer or a spectrum analyzer.

Figure 2:
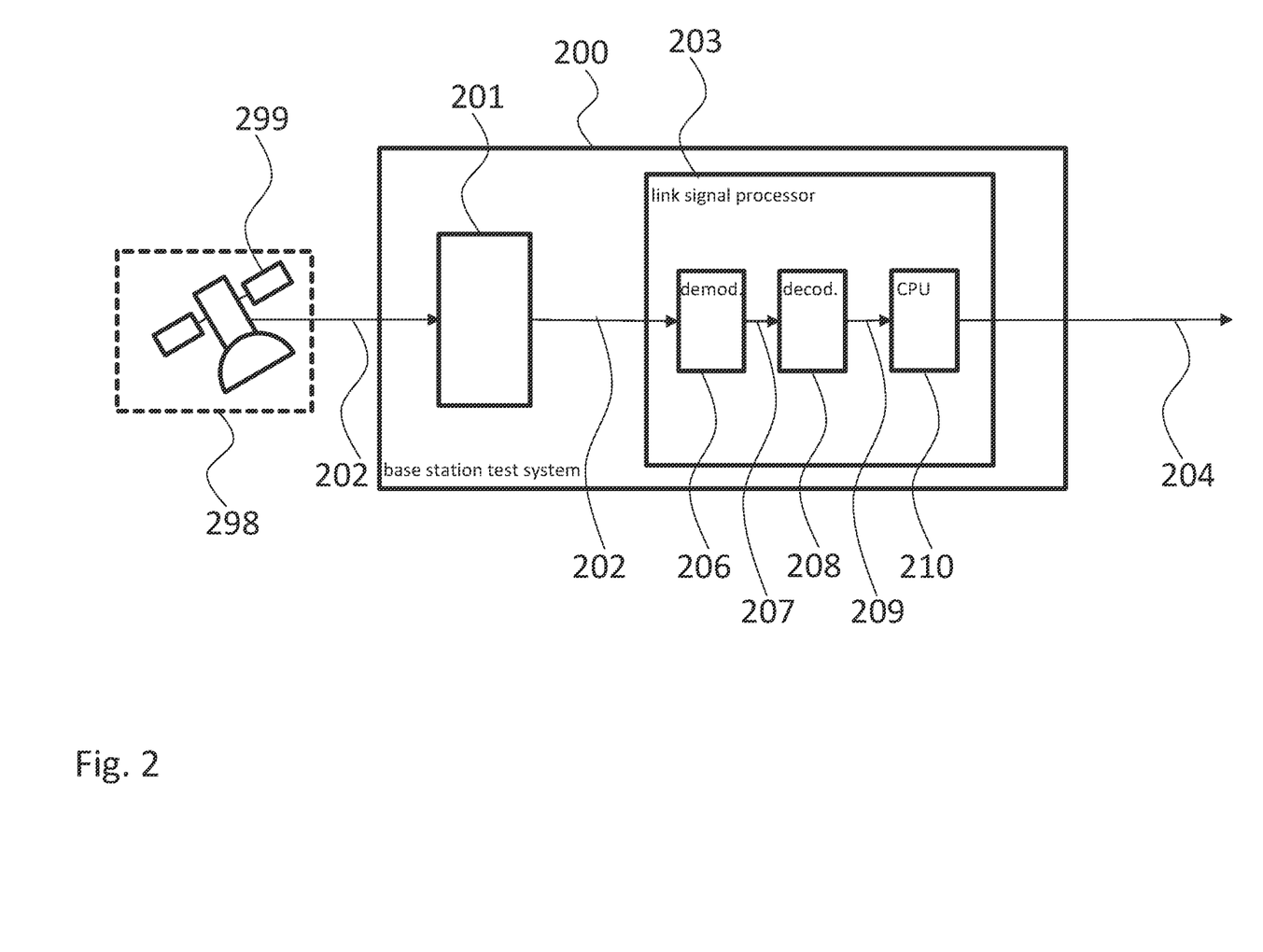
FIG. 2 shows a block diagram of another embodiment of a base station test system according to the present disclosure.

FIG. 2 shows a block diagram of a base station test system 200. The base station test system 200 is based on the base station test system 100, and comprises a link signal acquisition interface 201 that is coupled to a link signal processor 203.

In the base station test system 200, the link signal processor 203 comprises a demodulator 206 that receives the link signal 202 and is coupled to a decoder 208. The decoder 208 is further couple to a processing element 210. It is understood, that the demodulator 206 and the decoder 208 are optional, and that the function of the processing element 210 may be implemented in any type of processing element, as already indicated above.

The demodulator 206 receives the link signal 202 from the device under test 298/299 for demodulating the link signal 202. In embodiments without the decoder 208, the processing element 210 may operate on the demodulated link signal 207. In embodiments with the decoder 208, the decoder 208 may decode the demodulated link signal 207 and provide the processing element 210 with a decoded link signal 209.

In embodiments, the demodulator 206 and/or the decoder 208 may also be implemented at least in part in the processing element 210. In such embodiments, the demodulator 206 and/or the decoder 208 may, for example, comprise at least an analog-to-digital converter coupled to a processing element, like the link signal processor 203, and a respective function that operates on the data provided by the analog-to-digital converter.

Figure 3:
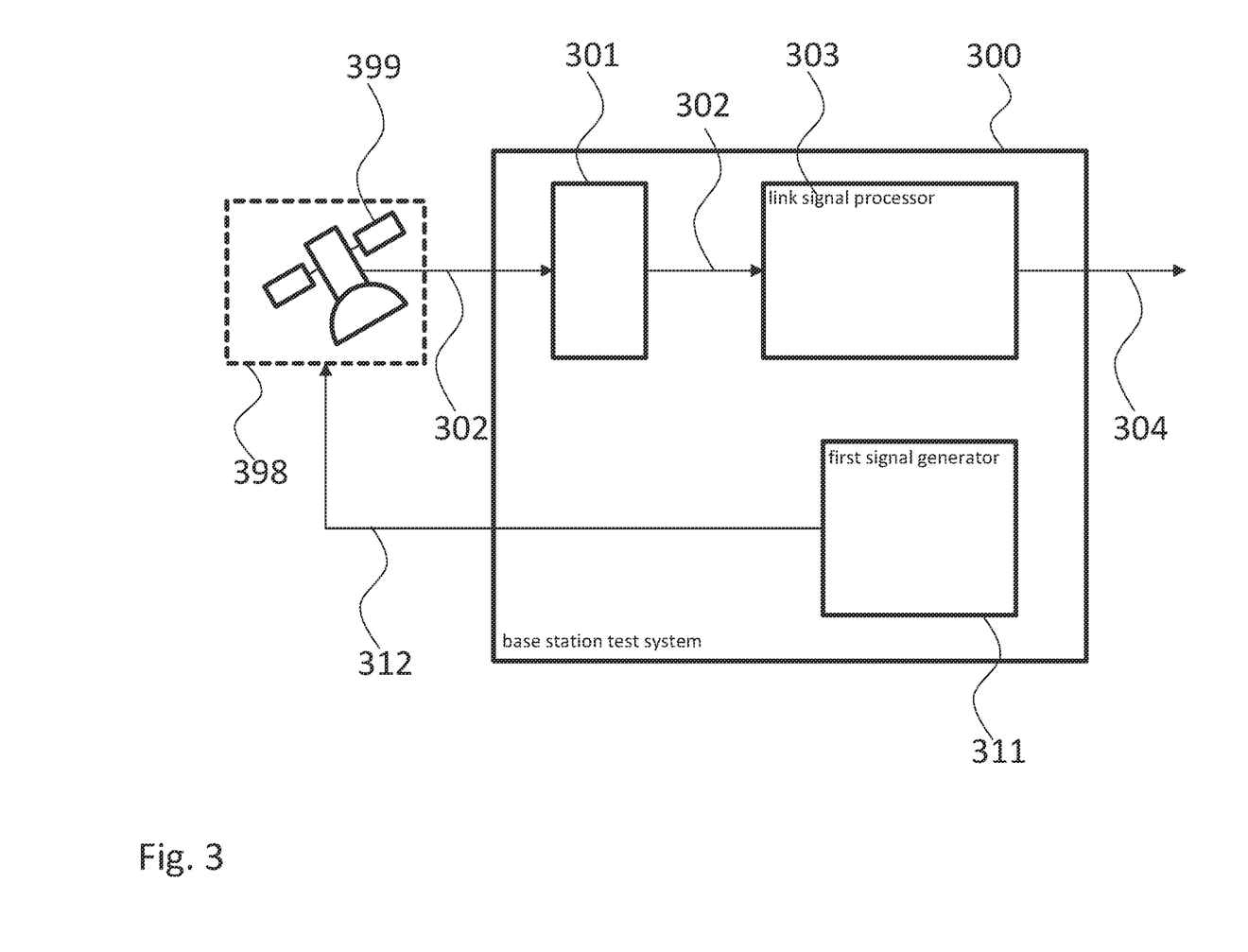
FIG. 3 shows a block diagram of a further embodiment of a base station test system according to the present disclosure.

FIG. 3 shows a block diagram of a further base station test system 300. The base station test system 300 is based on the base station test system 100. Therefore, the base station test system 300 comprises a link signal acquisition interface 301 that is coupled to a link signal processor 303.

In addition, the base station test system 300 comprises a first signal generator 311. The first signal generator 311 generates a serving link uplink signal 312, and provides the generated serving link uplink signal 312 to the device under test 398/399.

In response to the serving link uplink signal 312 provided to the device under test 398/399, the device under test 398/399 generates the link signal 302 as feeder link downlink signal. The link signal processor 303 may then determine the at least one parameter for the device under test 398/399 based on the feeder link downlink signal. Such a parameter may, for example, comprise the throughput of the device under test 398/399 or a delay caused by the device under test 398/399, as will be explained in more detail below.

The feeder link downlink signal may e.g., be demodulated and decoded, either externally if no demodulator or decoder is present in the base station test system 300, or by the demodulator and decoder if present in the base station test system 300. Based on the decoded feeder link downlink signal, the link signal processor 303 may then determine the throughput, for example, based on a BLER as indicated above.

Figure 4:
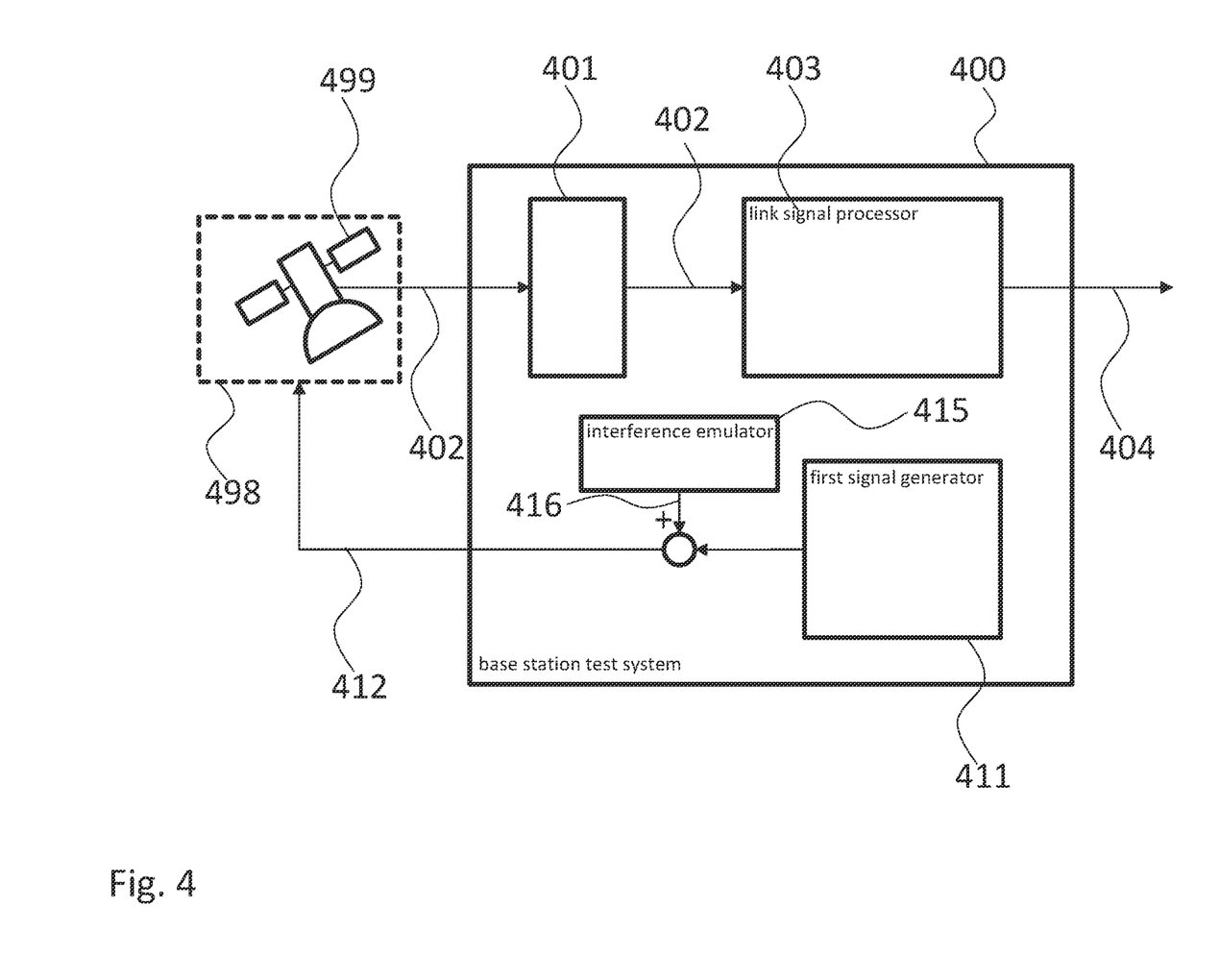
FIG. 4 shows a block diagram of an embodiment of a base station test system according to the present disclosure.

FIG. 4 shows a block diagram of a base station test system 400. The base station test system 400 is based on the base station test system 300. Therefore, the base station test system 400 comprises a link signal acquisition interface 401 that is coupled to a link signal processor 403. The link signal acquisition interface 401 receives the link signal 402 and provides the link signal 402 for further analysis to the link signal processor 403.

In addition, the base station test system 400 comprises an interference emulator 415. While the first signal generator 411 generates a serving link uplink signal 412, and provides the generated serving link uplink signal 412 to the device under test 498/499, the interference emulator 415 may be used to simulate or add different types of interference to the serving link uplink signal 412 prior to providing the serving link uplink signal 412 to the device under test 498/499, as explained in more detail above.

Although shown as dedicated element, the interference emulator 415 may in embodiments also be provided in the first signal generator 411.

Figure 5:
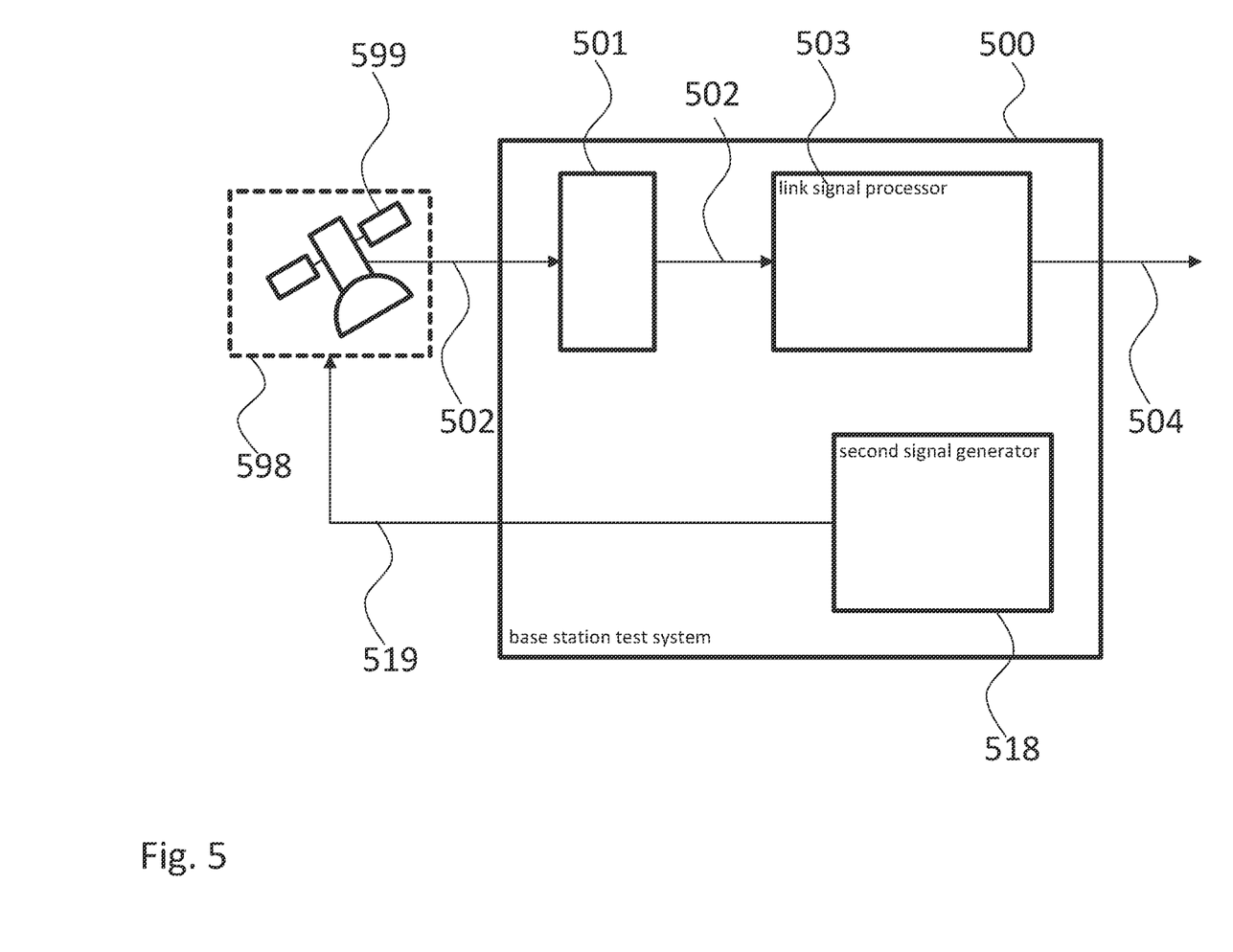
FIG. 5 shows a block diagram of a further embodiment of a base station test system according to the present disclosure.

FIG. 5 shows a block diagram of a base station test system 500. The base station test system 500 is based on the base station test system 100. Therefore, the base station test system 500 comprises a link signal acquisition interface 501 that is coupled to a link signal processor 503.

In addition, the base station test system 500 comprises a second signal generator 518. The second signal generator 518 generates a feeder link uplink signal 519 and provides the generated feeder link uplink signal 519 to the device under test 598/599.

With the feeder link uplink signal 519 as test signal provided to the device under test 598/599, the device under test 598/599 generates the link signal 502 as serving link downlink signal. The link signal 502 as serving link downlink signal may then be analyzed by the link signal processor 503 to determine at least one performance parameter of the device under test 598/599. Possible performance parameters comprise, but are not limited to, an error vector magnitude, also called EVM, an ACLR, also called Adjacent Channel Leakage Ratio, a SEM, also called spectrum emission mask, a transmit power, also called TX power, a power dynamic or power dynamic range, spurious emissions, a carrier frequency shift, a time alignment, and a time delay.

Figure 6:
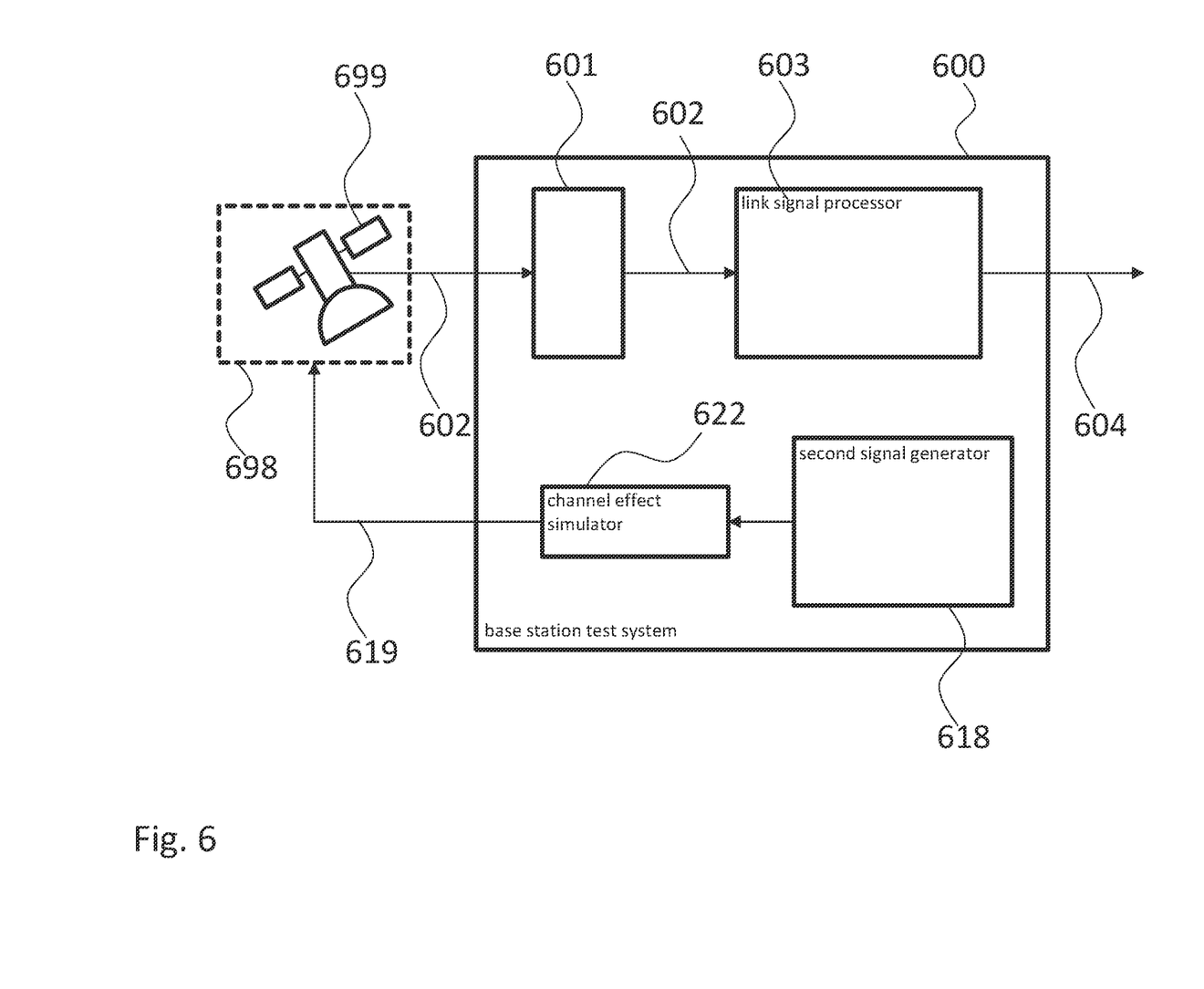
FIG. 6 shows a block diagram of another embodiment of a base station test system according to the present disclosure.

FIG. 6 shows a block diagram of a base station test system 600 that is based on the base station test system 500. The base station test system 600, therefore, comprises a link signal acquisition interface 601 that is coupled to a link signal processor 603, and a second signal generator 618.

In addition, the base station test system 600 comprises a channel effect simulator 622. The channel effect simulator 622 may simulate different effects, like a doppler effect pre-compensation and a time pre-compensation in the generated feeder link uplink signal 619. As explained above, such pre-compensation signals are usually generated by the NTN gateway on ground. In order to test the behavior of the device under test 698/699 the channel effect simulator 622 may introduce such signal components in the feeder link uplink signal 619.

Although shown as dedicated entity, the channel effect simulator 622 may in embodiments also be provided integrated into the second signal generator 618.

Figure 7:
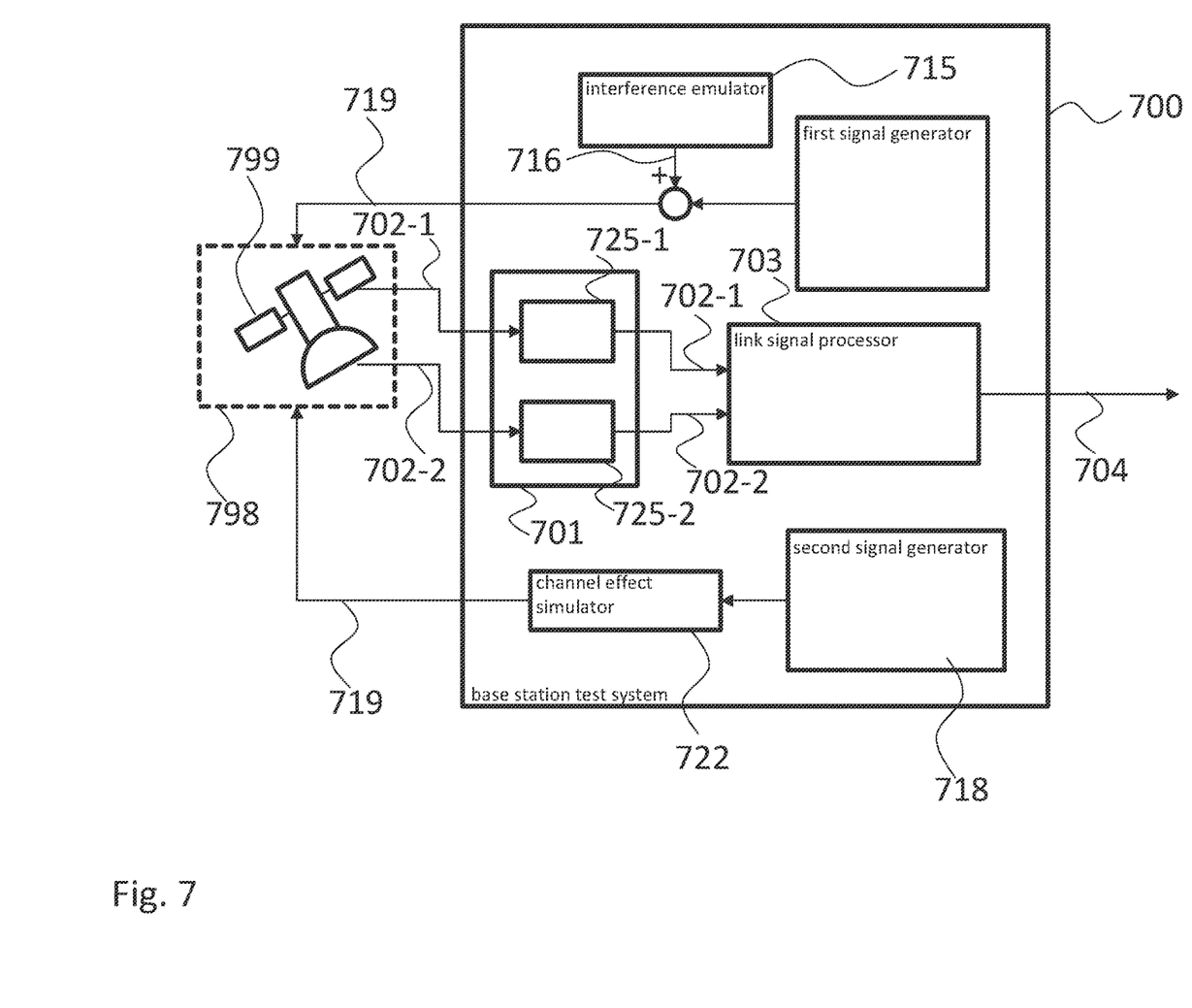
FIG. 7 shows a block diagram of an embodiment of a base station test system according to the present disclosure.

FIG. 7 shows a block diagram of a base station test system 700. The base station test system 700 may be seen as a combination of the base station test system 400 and the base station test system 600. Therefore, the base station test system 700 comprises a link signal acquisition interface 701 with two signal acquisition ports 725-1, 725-2, that are coupled to a link signal processor 703.

The base station test system 700 further comprises a first signal generator 711 with an optional interference emulator 715 that provide a serving link uplink signal 712 to the device under test 798/799.

Further, the base station test system 700 comprises a second signal generator 718 with an optional channel effect simulator 722 that provide a feeder link uplink signal 719 to the device under test 798/799.

The explanations given above regarding the base station test system 400 and the base station test system 600 apply to the base station test system 700 mutatis mutandis.

With the base station test system 700 the device under test 798/799 may be tested in both directions i.e., when provided with the serving link uplink signal 712 and generating the feeder link downlink signal, as well as when provided with the feeder link uplink signal 719 and generating the serving link downlink signal.

In cases that a single interface is provided in the device under test 798/799 to acquire the link signal 702 when the device under test 798/799 generates the feeder link downlink signal or the serving link downlink signal, only a single signal acquisition port 725-1, 725-2 may be coupled to the device under test 798/799.

Figure 8:
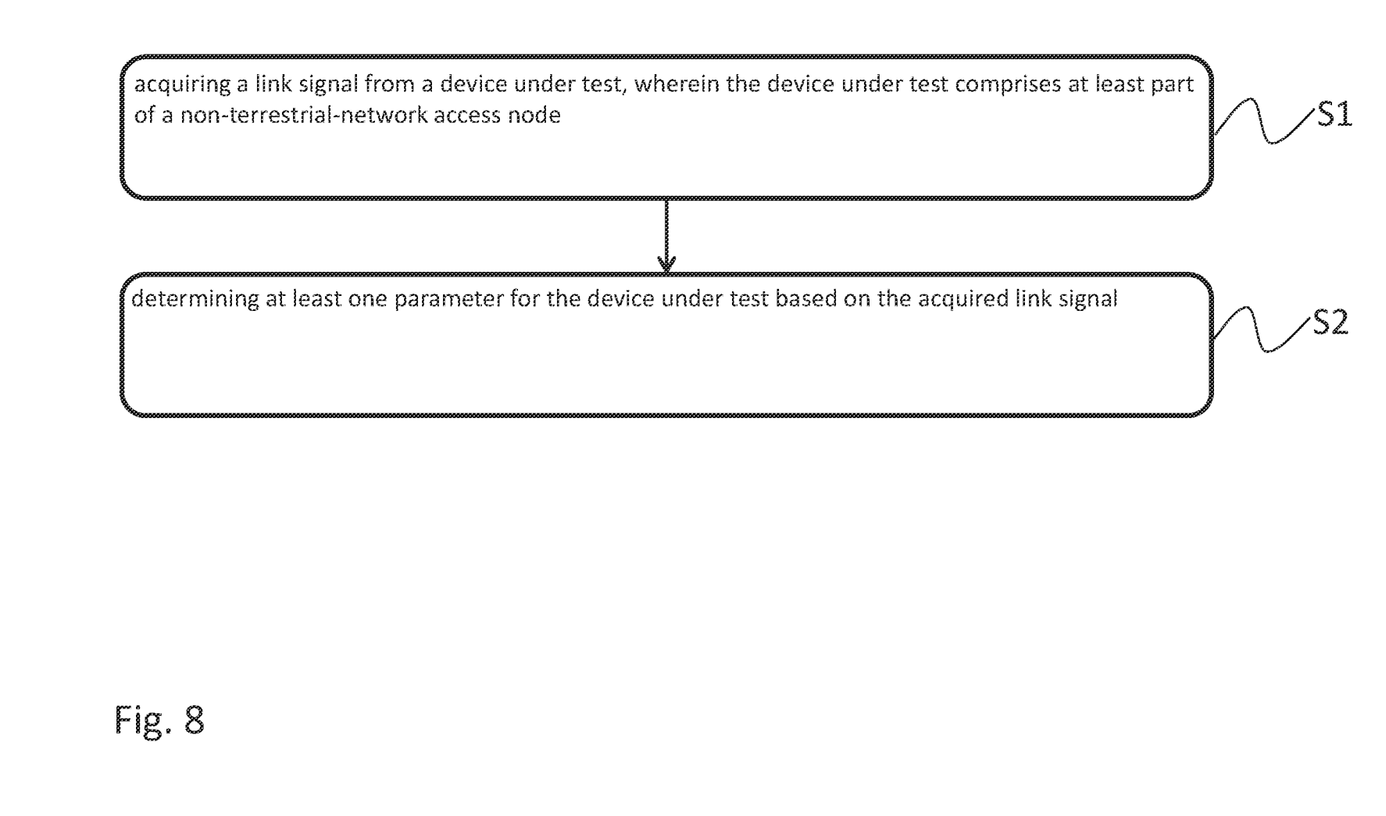
FIG. 8 shows a flow diagram of an embodiment of a method according to the present disclosure.

FIG. 8 shows a flow diagram of a method for testing a base station according to the present disclosure.

The method comprises acquiring a link signal from a device under test, wherein the device under test comprises at least part of a non-terrestrial-network access node, and determining at least one parameter for the device under test based on the acquired link signal.

Acquiring a link signal may comprise acquiring a feeder link downlink signal provided by the device under test.

In order to generate the feed link downlink signal in the device under test, the method may comprise generating a serving link uplink signal, and providing the generated serving link uplink signal to the device under test. In embodiments, a predetermined interference may be added to the generated serving link uplink signal prior to transmission of the generated serving link uplink signal to the device under test.

In an embodiment, the acquired link signal may be demodulated prior to determining the at least one parameter. In further embodiments, the demodulated acquired link signal may be decoded prior to determining the at least one parameter.

Based on the decoded feeder link downlink signal, a throughput may be determined for the device under test. In addition, or as alternative, a delay may be determined for the device under test based on the feeder link downlink signal.

In embodiments, a serving link downlink signal provided by the device under test may be acquired as link signal.

In order to generate the serving link downlink signal in the device under test, a feeder link uplink signal may be generated, and provided to the device under test.

In embodiments, at least one performance parameter for the device under test may be determined as the parameter of the device under test.

The method may further comprise simulating at least one of a doppler effect pre-compensation and a time pre-compensation in the generated feeder link uplink signal.

In embodiments, two sub-methods of the method according to the present disclosure may be performed in parallel or consecutively. The first sub-method may comprise all method steps required for determining the throughput and/or the delay of the device under test, while the second sub-method may comprise all method steps required for determining the performance parameter of the device under test.

It is understood, that the optional steps of generating a serving link uplink signal, and optionally adding a predetermined interference to the generated serving link uplink signal prior to transmission of the generated serving link uplink signal to the device under test, as well as the optional steps of generating a feeder link uplink signal and simulating at least one of a doppler effect pre-compensation and a time pre-compensation in the generated feeder link uplink signal may also be implemented in the respective sub-methods.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS 100, 200, 300, 400, 500, 600, 700 base station test system
101, 201, 301, 401, 501, 601, 701 link signal acquisition interface
102, 202, 302, 402, 502, 602 link signal
702-1, 702-2 link signal 103, 203, 303, 403, 503, 603, 703 link signal processor
104, 204, 304, 404, 504, 604, 704 parameter
206 demodulator
207 demodulated link signal
208 decoder
209 decoded link signal
210 processing element
311, 411, 711 first signal generator
312, 412, 712 serving link uplink signal
415, 715 interference emulator
416, 716 interference
518, 618, 718 second signal generator
519, 619, 719 feeder link uplink signal
622, 722 channel effect simulator
725-1, 725-2 port
198, 298, 398, 498, 598, 698, 798 device under test
199, 299, 399, 499, 599, 699, 799 non-terrestrial-network access node
S1, S2 method steps

The invention claimed is:

1. A base station test system comprising:
a link signal acquisition interface configured to acquire a feeder link downlink signal from a device under test, wherein the device under test comprises at least part of a non-terrestrial-network access node;
a link signal processor coupled to the link signal acquisition interface, wherein the link signal processor is configured to determine at least one parameter for the device under test based on the acquired feeder link downlink signal;
a first signal generator configured to generate a serving link uplink signal, and to provide the generated serving link uplink signal to the device under test; and
an interference emulator coupled to, or integrated into, the first signal generator and configured to add a predetermined interference to the generated serving link uplink signal prior to transmission of the generated serving link uplink signal to the device under test.

2. The base station test system according to claim 1, wherein the link signal processor comprises a demodulator that is configured to demodulate the acquired feeder link downlink signal.

3. The base station test system according to claim 2, wherein the link signal processor further comprises a decoder that is coupled to the demodulator, and that is configured to decode the demodulated acquired feeder link downlink signal.

4. The base station test system according to claim 1, wherein the link signal processor is configured to determine at least one of a throughput or a delay for the device under test.

5. The base station test system according to claim 1, wherein the link signal acquisition interface is configured to acquire a serving link downlink signal provided by the device under test.

6. The base station test system according to claim 5, further comprising a second signal generator configured to generate a feeder link uplink signal, and to provide the generated feeder link uplink signal to the device under test.

7. The base station test system according to claim 6, further comprising a channel effect simulator coupled to, or integrated into the second signal generator, and configured to simulate at least one of a doppler effect pre-compensation or a time pre-compensation in the generated feeder link uplink signal.

8. The base station test system according to claim 5, wherein the link signal processor is configured to determine at least one performance parameter for the device under test.

9. A method for testing a base station comprising:
acquiring a link signal from a device under test, wherein the device under test comprises at least part of a non-terrestrial-network access node;
determining at least one parameter for the device under test based on the acquired link signal,
wherein at least one of:
(i) acquiring the link signal comprises acquiring a feeder link downlink signal provided by the device under test,
the method further comprising:
generating a serving link uplink signal; and
providing the generated serving link uplink signal to the device under test; and
adding a predetermined interference to the generated serving link uplink signal prior to transmission of the generated serving link uplink signal to the device under test; or
(ii) acquiring the link signal comprises acquiring a serving link downlink signal provided by the device under test,
the method further comprising:
generating a feeder link uplink signal; and
providing the generated feeder link uplink signal to the device under test; and
simulating at least one of a doppler effect pre-compensation or a time pre-compensation in the generated feeder link uplink signal.

10. The method according to claim 9, further comprising:
demodulating the acquired link signal prior to determining the at least one parameter.

11. The method according to claim 10, further comprising:
decoding the demodulated acquired link signal prior to determining the at least one parameter.

12. The method according to claim 9, wherein determining at least one parameter comprises determining at least one of a throughput or a delay for the device under test based on the feeder link downlink signal.

13. The method according to claim 9, wherein determining at least one parameter comprises determining at least one performance parameter for the device under test.

14. A base station test system comprising:
a link signal acquisition interface configured to acquire a serving link downlink signal from a device under test, wherein the device under test comprises at least part of a non-terrestrial-network access node;
a link signal processor coupled to the link signal acquisition interface, wherein the link signal processor is configured to determine at least one parameter for the device under test based on the acquired serving link downlink signal;
a signal generator configured to generate a feeder link uplink signal, and to provide the generated feeder link uplink signal to the device under test; and
a channel effect simulator coupled to, or integrated into, the signal generator, and configured to simulate at least one of a doppler effect pre-compensation or a time pre-compensation in the generated feeder link uplink signal.

* * * * *